United States Patent
Yankevich et al.

(10) Patent No.: US 12,557,036 B2
(45) Date of Patent: Feb. 17, 2026

(54) INCREASING CHANNEL AVAILABILITY

(71) Applicant: Cisco Technology, Inc., San Jose, CA (US)

(72) Inventors: Evgeny Yankevich, Richfield, OH (US); Brian Hart, Sunnyvale, CA (US); Matt Silverman, Shaker Heights, OH (US)

(73) Assignee: Cisco Technology, Inc.

( * ) Notice: Subject to any disclaimer, the term of this patent is extended or adjusted under 35 U.S.C. 154(b) by 442 days.

(21) Appl. No.: 18/163,448

(22) Filed: Feb. 2, 2023

(65) Prior Publication Data
US 2024/0267852 A1    Aug. 8, 2024

(51) Int. Cl.
*H04W 52/54*    (2009.01)
*H04L 5/00*     (2006.01)
*H04W 52/26*    (2009.01)

(52) U.S. Cl.
CPC ......... *H04W 52/265* (2013.01); *H04L 5/0073* (2013.01); *H04W 52/267* (2013.01)

(58) Field of Classification Search
CPC .............. H04L 5/0073; H04W 52/143; H04W 52/241; H04W 52/243; H04W 52/265; H04W 52/267; H04W 52/346; H04W 52/367; H04W 52/42
See application file for complete search history.

(56) References Cited

U.S. PATENT DOCUMENTS

| | | | | |
|---|---|---|---|---|
| 2009/0111463 A1* | 4/2009 | Simms | .................. | H04W 16/14 455/424 |
| 2009/0323835 A1* | 12/2009 | Rao | ....................... | H04L 5/0062 375/260 |
| 2013/0130731 A1* | 5/2013 | Kim | ...................... | H04W 52/58 455/501 |

(Continued)

FOREIGN PATENT DOCUMENTS

WO    2023003614 A1    1/2023

OTHER PUBLICATIONS

Wi-Fi 6E: The Next Great Chapter in Wi-Fi White Paper; Cisco (Nov. 19, 2021) 10 pages.

(Continued)

*Primary Examiner* — Phuc H Tran
(74) *Attorney, Agent, or Firm* — Merchant & Gould P.C.

(57) ABSTRACT

Increased channel availability may be provided. A computing device may receive radio channel information comprising a radio channel to operate within and an incumbent indication indicating whether an incumbent is using the radio channel. Next, power to operate a radio at may be determined based on the incumbent indication. When the incumbent indication indicates an incumbent is present on the radio channel, determining the power to operate the radio based on the incumbent indication comprises: i) determining a first power level for subcarriers in the radio channel that are non-overlapping with a portion of the radio channel used by the incumbent; and ii) determining a second power level (Continued)

for subcarriers in the radio channel that are overlapping with the portion of the radio channel used by the incumbent wherein the first power level is greater than the second power level. The radio may then be operated at the determined power.

20 Claims, 3 Drawing Sheets

(56) References Cited

U.S. PATENT DOCUMENTS

| | | | |
|---|---|---|---|
| 2015/0223182 A1* | 8/2015 | Kim | H04W 52/146 370/329 |
| 2020/0359229 A1 | 11/2020 | Macmullan et al. | |
| 2021/0266847 A1 | 8/2021 | Cariou et al. | |
| 2021/0360633 A1 | 11/2021 | Chu et al. | |
| 2022/0027254 A1 | 1/2022 | Kolesnik et al. | |
| 2022/0256547 A1 | 8/2022 | Macmullan et al. | |
| 2022/0303782 A1* | 9/2022 | Litjens | H04W 16/14 |

OTHER PUBLICATIONS

International Search Report and Written Opinion for International Application No. PCT/US2024/014160, mailed May 31, 2024, 17 Pages.

Qiao J., et al., "Demonstration of Overlay Dynamic Spectrum Access based on SMSE framework", 2018 Eighth International Conference on Instrumentation and Measurement, Computer, Communication and Control (IMCCC), IEEE, Jul. 19, 2018, pp. 553-557, XP033746061, DOI: 10.1109/IMCCC.2018.00122, The whole document.

Thumar V., et al., "Distributed Resource Allocation for Cognitive Radio Networks: Sub-carrier Power and Bandwidth sizing", 2013 IEEE 78th Vehicular Technology Conference (VTC Fall), IEEE, Sep. 2, 2023, pp. 1-6, XP032548348, ISSN: 1090-3038, DOI: 10.1109/VTCFALL.2013.6692166, 6 Pages, The whole document.

* cited by examiner

INCREASING CHANNEL AVAILABILITY

TECHNICAL FIELD

The present disclosure relates generally to increasing channel availability.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
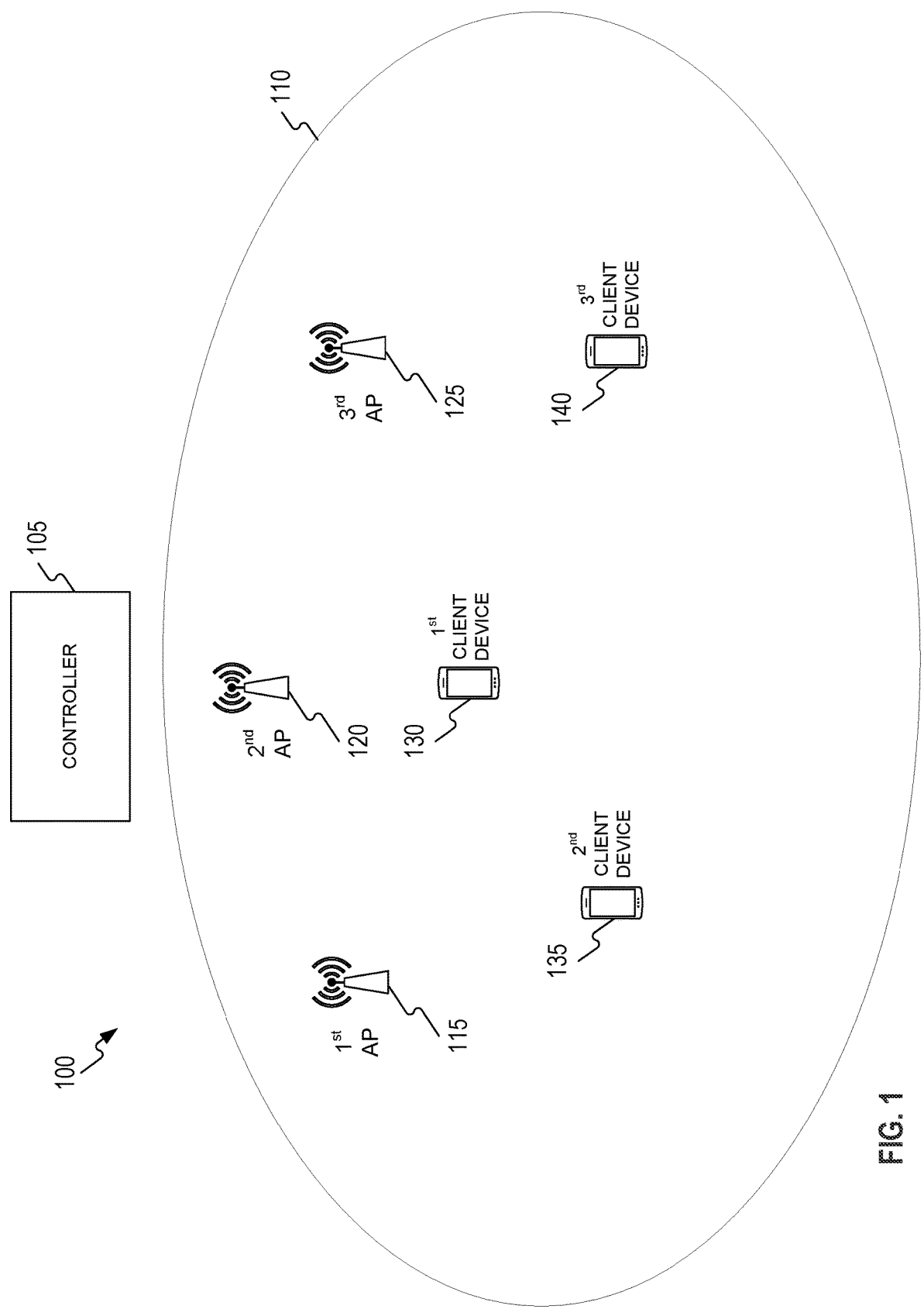
FIG. 1 is a block diagram of an operating environment for providing increased channel availability.

Increased channel availability may be provided. A computing device may receive radio channel information comprising a radio channel to operate within and an incumbent indication indicating whether an incumbent is using the radio channel. Next, power to operate a radio at may be determined based on the incumbent indication. When the incumbent indication indicates an incumbent is present on the radio channel, determining the power to operate the radio based on the incumbent indication comprises: i) determining a first power level for subcarriers in the radio channel that are non-overlapping with a portion of the radio channel used by the incumbent; and ii) determining a second power level for subcarriers in the radio channel that are overlapping with the portion of the radio channel used by the incumbent wherein the first power level is greater than the second power level. The radio may then be operated at the determined power.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Automated Frequency Coordination (AFC) is a spectrum use coordination system that comprises a registered database of the bands in use by various types of radio frequency services in a particular area. Before starting operation at the 6 GHz band for example, indoor Access Points (APs) that operate at standard power level (or outdoor APs using lower power) may send requests to an AFC system. The AFC system may calculate path losses between APs and surrounding Fixed Services (FS) links (i.e., incumbent users), compares them to a signal-to-noise threshold, and then, based on this information, it may return to the APs available channels and transmission power levels.

Wireless channels (e.g., Wi-Fi channels) and channel Bandwidth (BW) may have only a small overlap with the incumbent's channels. For example, a 20 MHz wireless channel may only have an overlap of 2 MHz with the incumbent's channel. If the signal level in this overlapping range is high enough to cause exceedance of a predefined interference-to-noise threshold (e.g., I/N=−6 dB), then the Wi-Fi channel may be taken out of use by the AP. According, in some geographic areas, no wireless channels may be available due to the channels being taken out due to small overlaps with incumbents on the channels.

Embodiments of the disclosure may help to mitigate this exceedance and may increase the number of channels available for wireless. For example, embodiments of the disclosure may reduce and coordinate the Power Spectral Density (PSD) level for frequency slices within overlapping frequency range between the AP channels and the incumbent user channels. This may allow improved channel availability especially for geographic areas with flat terrain that may cause low channel availability.

FIG. 1 shows an operating environment 100 for providing increased channel availability. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125. The plurality of APs may provide wireless network access to a plurality of client devices as they move within coverage environment 110. The plurality of client devices may comprise, but are not limited to, a first client device 130, a second client device 135, and a third client device 140. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11 specification standard for example.

Controller 105 may comprise a Wireless Local Area Network controller (WLC) and may provision and control coverage environment 110 (e.g., a WLAN). Controller 105 may allow first client device 130, second client device 135, and third client device 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide increased channel availability.

The elements described above of operating environment 100 (e.g., controller 105, first AP 115, second AP 120, third AP 125, first client device 130, second client device 135, or third client device 140) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
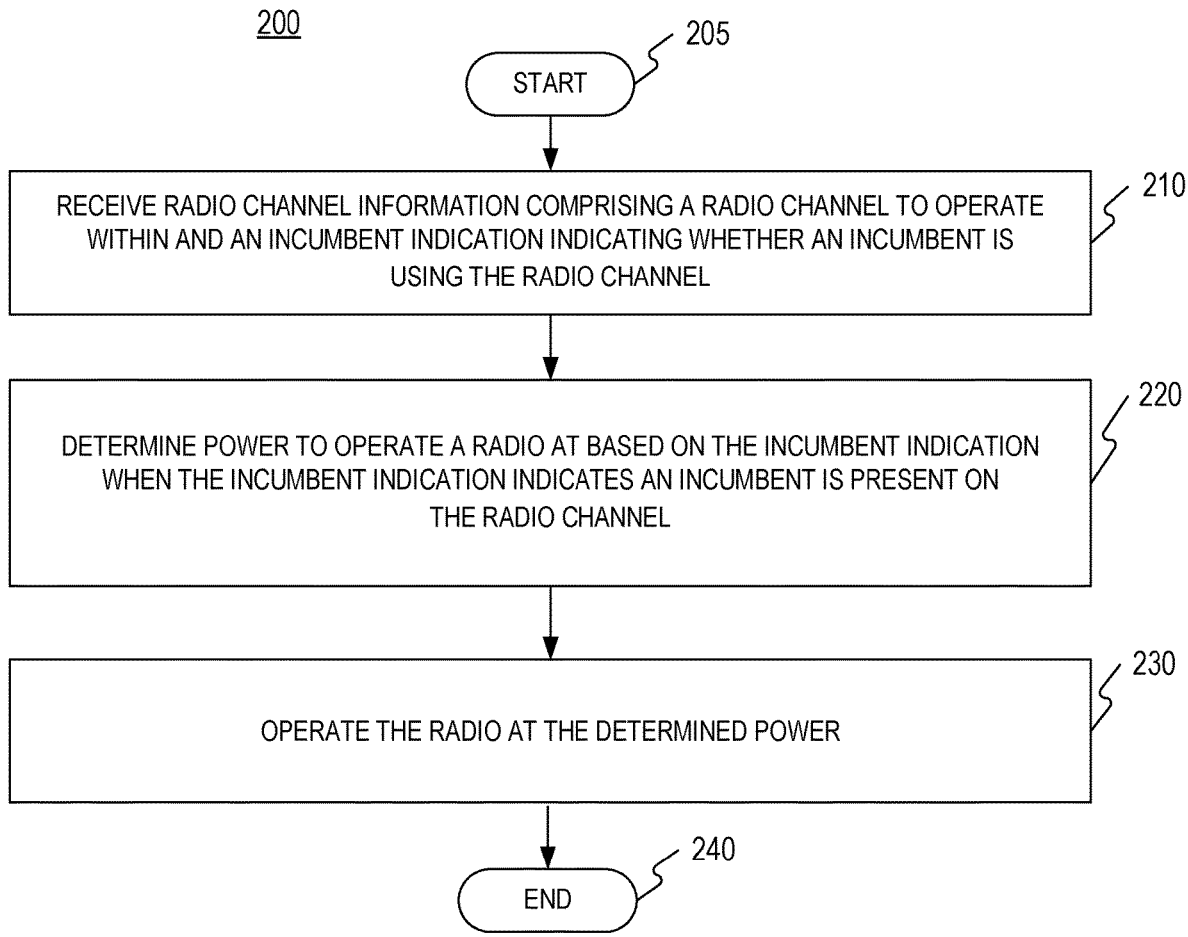
FIG. 2 is a flow chart of a method for providing increased channel availability.

FIG. 2 is a flow chart setting forth the general stages involved in a method 200 consistent with embodiments of the disclosure providing increased channel availability. Method 200 may be implemented using first AP 115 as described in more detail above with respect to FIG. 1. Ways to implement the stages of method 200 will be described in greater detail below.

Method 200 may begin at starting block 205 and proceed to stage 210 where first AP 115 may receive radio channel information comprising a radio channel to operate within and an incumbent indication indicating whether an incumbent is using the radio channel. For example, controller 105 may poll the AFC database based, for example, on geolocation of the network (e.g., coverage environment 110), antenna, height, etc. of the plurality of APs (e.g., first AP 115, second AP 120, and third AP 125). The AFC database may return to controller 105 impacted channels that are above a regulatory limit for Interference-to-Noise ratio (I/N). The AFC may also return to controller 105 a list of incumbents that are above the I/N limit along with their center frequencies, bandwidths, and how many Decibels (dB) above limit they are.

Then controller 105 may maintain a "clean" list of channels that are unoccupied by incumbents to the regulatory limit. Also, controller 105 may keep an "occupied" list of channels where incumbents are present along with the center frequencies and bandwidths of those incumbents and how much above the I/N limit they are. Controller 105 may set operating channels for the radios on the plurality of APs and if the set operating channels are from the "occupied" list.

From stage 210, where first AP 115 receives radio channel information comprising the radio channel to operate within and the incumbent indication indicating whether an incumbent is using the radio channel, method 200 may advance to stage 220 where first AP 115 may determine power to operate a radio based on the incumbent indication when the incumbent indication indicates an incumbent is present on the radio channel. Determining the power to operate the radio may comprise determining a first power level for subcarriers in the radio channel that are non-overlapping with a portion of the radio channel used by the incumbent. For example, the radio in first AP 115 may be configured to apply a power boost to any subcarrier in the radio channel that is non-overlapping within 1 MHz of the incumbent's operating channel. The power boost may allow the radio to transmit at up to the Standard Power Indoor (SPI) PSD limits for those subcarriers.

Furthermore, determining the power to operate the radio may comprise determining a second power level for sub-carriers in the radio channel that are overlapping with the portion of the radio channel used by the incumbent. The first power level may be greater than the second power level. For example, for any subcarrier that is within 1 MHz of any incumbent operating channel, the power may be operated at up to Low Power Indoor (LPI) PSD levels (e.g., applicable for an indoor case). In a more general embodiment, these subcarriers may be transmitted at up to the I/N PSD limit by subtracting from the SPI level the amount that the AFC system reported the incumbent to be over the I/N limit. Based on this information, first AP 115 may calculate an amount of signal reduction needed to reduce the PSD level for frequency slices (i.e., subcarriers) with overlap in order to bring the level of interfering signal to the level that meets the I/N level at the incumbent. If the new PSD level is not lower than a maximum PSD at the client device side and if a delta between old and new PSD levels is not bigger than a predefined threshold, then first AP 115 may pre-equalize corresponding sub-carriers in overlapping frequency range on the transmitter side and allow this channel to be used and not set aside.

Once first AP 115 determines the power to operate the radio based on the incumbent indication when the incumbent indication indicates the incumbent is present on the radio channel in stage 220, method 200 may continue to stage 230 where first AP 115 may operate the radio at the determined power. For example, any associated Wi-Fi7 or earlier client device may be forced to transmit at LPI PSD levels. Any associated Wi-Fi8 client device may be configured to transmit with the same subcarrier boosting as first AP 115. With embodiments of the disclosure, a beacon, probe response, or probe request attribute may advertise support for adjusting PSD based on AFC incumbents. At association, for example, a Wi-Fi8 client that supports this feature may receive information about incumbents from first AP 115 at association time via probe response. In other embodiments, the information about the incumbent may be shared with the associated client device in an action frame. The action frame may contain information about incumbent devices on a channel along with Fc, BW, and I/N overage for example. Accordingly, a client device setting PSD per subcarrier based on incumbent on all frame types in a channel where incumbents are occupying may be provided.

The information about how to boost the subcarriers may be shared at association time with a client device. If first AP 115 detects that a client device is not adhering to the power scheme properly, it may force the client device into LPI-only PSD levels. First AP 115 may detect this by comparing Received Signal Strength Indicator (RSSI) of subcarriers that are close in frequency, but should have different power levels per above power scheme. If the RSSI difference does not match expectation, the client device may be flagged as not adhering and may be considered as not supporting this type of transmission. Once first AP 115 operate the radio at the determined power in stage 240, method 200 may then end at stage 250.

Figure 3:
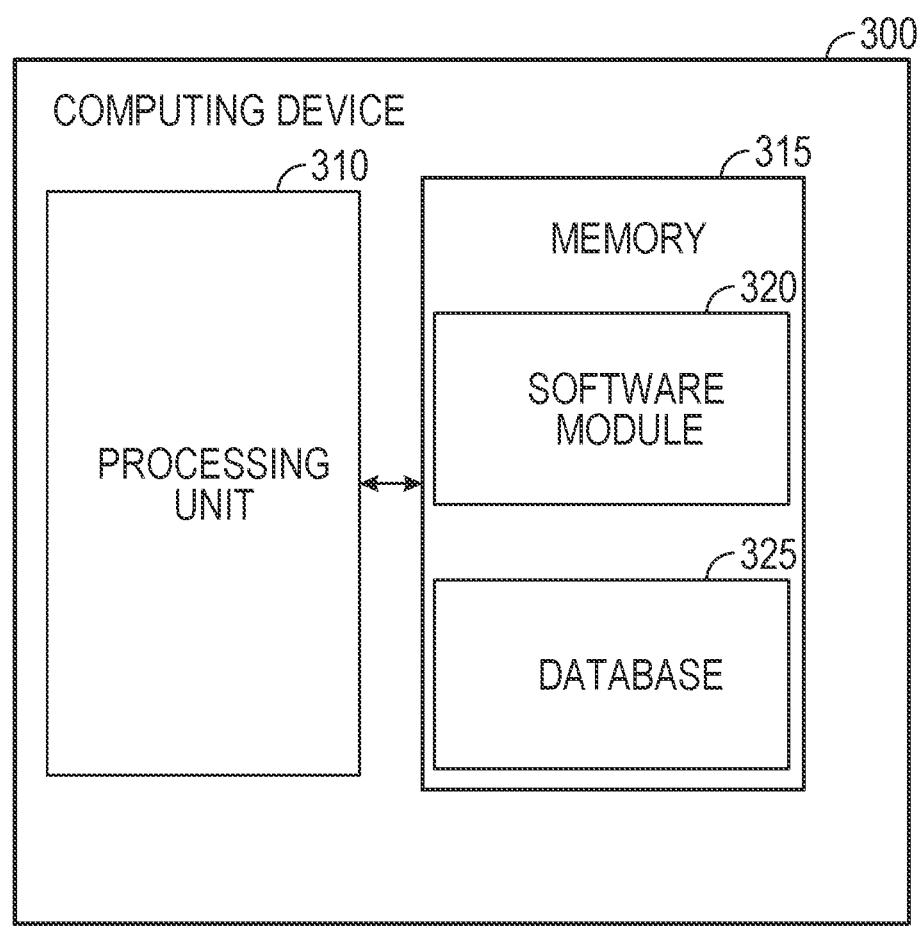
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing increased channel availability as described above with respect to FIG. 2. Computing device 300, for example, may provide an operating environment for controller 105, first AP 115, second AP 120, third AP 125, first client device 130, second client device 135, or third client device 140. Controller 105, first AP 115, second AP 120, third AP 125, first client device 130, second client device 135, or third client device 140 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
 receiving, by a computing device, radio channel information comprising a radio channel and an incumbent indication indicating whether an incumbent is using the radio channel;
 determining power to operate a radio at based on the incumbent indication, wherein when the incumbent indication indicates the incumbent is present on the radio channel, determining the power to operate the radio at based on the incumbent indication comprises;
  determining a first power level for subcarriers in the radio channel that are non-overlapping with a portion of the radio channel used by the incumbent, and
  determining a second power level for subcarriers in the radio channel that are overlapping with the portion of the radio channel used by the incumbent wherein the first power level is greater than the second power level; and
 operating the radio at the determined power.

2. The method of claim 1, wherein the first power level allows for up to Standard Power Indoor (SPI) Power Spectral Density (PSD) limits for subcarriers in the radio channel that are non-overlapping with the portion of the radio channel used by the incumbent.

3. The method of claim 1, wherein the second power level allows for up to Low Power Indoor (LPI) Power Spectral Density (PSD) limits for subcarriers in the radio channel that are overlapping with the portion of the radio channel used by the incumbent.

4. The method of claim 1, wherein determining the second power level comprises determining the second power level that reduces a Power Spectral Density (PSD) for the subcarriers in the radio channel that are overlapping with the portion of the radio channel used by the incumbent to meet a predetermined interference-to-noise threshold.

5. The method of claim 1, further comprising causing client devices associated with the computing device to operate at the determined power.

6. The method of claim 1, wherein receiving the radio channel information comprises receiving the radio channel information from a controller.

7. The method of claim 1, wherein the computing device comprises an Access Point (AP).

8. A system comprising:
 a memory storage; and
 a processing unit coupled to the memory storage, wherein the processing unit is operative to:
  receive radio channel information comprising a radio channel and an incumbent indication indicating whether an incumbent is using the radio channel;
  determine power to operate a radio at based on the incumbent indication, wherein when the incumbent indication indicates the incumbent is present on the radio channel, determining the power to operate the radio at based on the incumbent indication comprises processing unit being operative to;
   determine a first power level for subcarriers in the radio channel that are non-overlapping with a portion of the radio channel used by the incumbent, and
   determine a second power level for subcarriers in the radio channel that are overlapping with the portion of the radio channel used by the incumbent wherein the first power level is greater than the second power level; and
  operate the radio at the determined power.

9. The system of claim 8, wherein the first power level allows for up to Standard Power Indoor (SPI) Power Spectral Density (PSD) limits for subcarriers in the radio channel that are non-overlapping with the portion of the radio channel used by the incumbent.

10. The system of claim 8, wherein the second power level allows for up to Low Power Indoor (LPI) Power Spectral Density (PSD) limits for subcarriers in the radio channel that are overlapping with the portion of the radio channel used by the incumbent.

11. The system of claim 8, wherein processing unit being operative to determine the second power level comprises processing unit being operative to determine the second power level that reduces a Power Spectral Density (PSD) for the subcarriers in the radio channel that are overlapping with the portion of the radio channel used by the incumbent to meet a predetermined interference-to-noise threshold.

12. The system of claim 8, wherein to processing unit is further operative to cause client devices to operate at the determined power.

13. The system of claim 8, wherein the processing unit being operative to receive the radio channel information comprises the processing unit being operative to receive the radio channel information from a controller.

14. A non-transitory computer-readable medium that stores a set of instructions which when executed perform a method executed by the set of instructions comprising:
 receiving, by a computing device, radio channel information comprising a radio channel and an incumbent indication indicating whether an incumbent is using the radio channel;
 determining power to operate a radio at based on the incumbent indication, wherein when the incumbent indication indicates the incumbent is present on the radio channel, determining the power to operate the radio at based on the incumbent indication comprises;
  determining a first power level for subcarriers in the radio channel that are non-overlapping with a portion of the radio channel used by the incumbent, and
  determining a second power level for subcarriers in the radio channel that are overlapping with the portion of the radio channel used by the incumbent wherein the first power level is greater than the second power level; and
 operating the radio at the determined power.

15. The non-transitory computer-readable medium of claim 14, wherein the first power level allows for up to Standard Power Indoor (SPI) Power Spectral Density (PSD) limits for subcarriers in the radio channel that are non-overlapping with the portion of the radio channel used by the incumbent.

16. The non-transitory computer-readable medium of claim 14, wherein the second power level allows for up to Low Power Indoor (LPI) Power Spectral Density (PSD) limits for subcarriers in the radio channel that are overlapping with the portion of the radio channel used by the incumbent.

17. The non-transitory computer-readable medium of claim 14, wherein determining the second power level comprises determining the second power level that reduces a Power Spectral Density (PSD) for the subcarriers in the radio channel that are overlapping with the portion of the radio channel used by the incumbent to meet a predetermined interference-to-noise threshold.

18. The non-transitory computer-readable medium of claim 14, further comprising causing client devices associated with the computing device to operate at the determined power.

19. The non-transitory computer-readable medium of claim 14, wherein receiving the radio channel information comprises receiving the radio channel information from a controller.

20. The non-transitory computer-readable medium of claim 14, wherein the computing device comprises an Access Point (AP).

\* \* \* \* \*